(12) United States Patent
Linger et al.

(10) Patent No.: US 6,557,883 B2
(45) Date of Patent: *May 6, 2003

(54) GLIDER FIFTH WHEEL ATTACHMENT

(75) Inventors: Don F. Linger, Stockton, CA (US); Jeffrey V. Sweeney, Stockton, CA (US)

(73) Assignee: Valley Industries, Madison Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,756

(22) Filed: Feb. 25, 2002

(65) Prior Publication Data

US 2002/0149171 A1 Oct. 17, 2002

Related U.S. Application Data

(63) Continuation of application No. 09/834,317, filed on Apr. 13, 2001, now Pat. No. 6,386,570, which is a continuation of application No. 09/320,498, filed on May 26, 1999, now Pat. No. 6,247,720.

(51) Int. Cl.[7] .............................................. B62D 53/06
(52) U.S. Cl. ...................................... 280/441; 280/901
(58) Field of Search .............................. 280/441, 441.1, 280/439, 438.1, 901

(56) References Cited

U.S. PATENT DOCUMENTS

| 4,029,335 A | 6/1977 | Cady et al. |
| 4,856,804 A | 8/1989 | Nash |
| 5,449,191 A | 9/1995 | Cattau |
| 5,509,682 A | 4/1996 | Lindenman et al. |
| 5,516,137 A | 5/1996 | Kass et al. |
| 5,529,329 A | 6/1996 | McCoy |
| 5,707,070 A | 1/1998 | Lindenman et al. |
| 5,772,229 A | 6/1998 | Cattau |
| 5,839,745 A | 11/1998 | Cattau et al. |
| 6,247,720 B1 | 6/2001 | Linger et al. |
| 6,357,777 B1 * | 3/2002 | Linger et al. ............... 280/441 |
| 6,386,570 B2 * | 5/2002 | Linger et al. ............... 280/441 |

* cited by examiner

*Primary Examiner*—Lesley D. Morris
*Assistant Examiner*—Matthew Luby
(74) *Attorney, Agent, or Firm*—Rader, Fishman & Grauer PLLC

(57) ABSTRACT

A glider fifth wheel attachment assembly includes a support frame including a pair of spaced guide rails and a pair of upright assemblies attached to the guide rails. Each upright assembly includes a lower sleeve portion for receiving a respective guide rail, an intermediate housing portion vertically above the sleeve portion, and an upper mounting portion vertically above the housing portion. A head assembly may be adjustably mounted between respective housing portions of the upright assemblies. At least one roller is positioned within each housing portion of the upright assemblies such that the at least one roller contacts an upper surface of an upper guide rail. In addition, the glider fifth wheel attachment assembly includes a latching assembly for releasably locking the glider fifth wheel attachment assembly between a first and a second position.

15 Claims, 2 Drawing Sheets

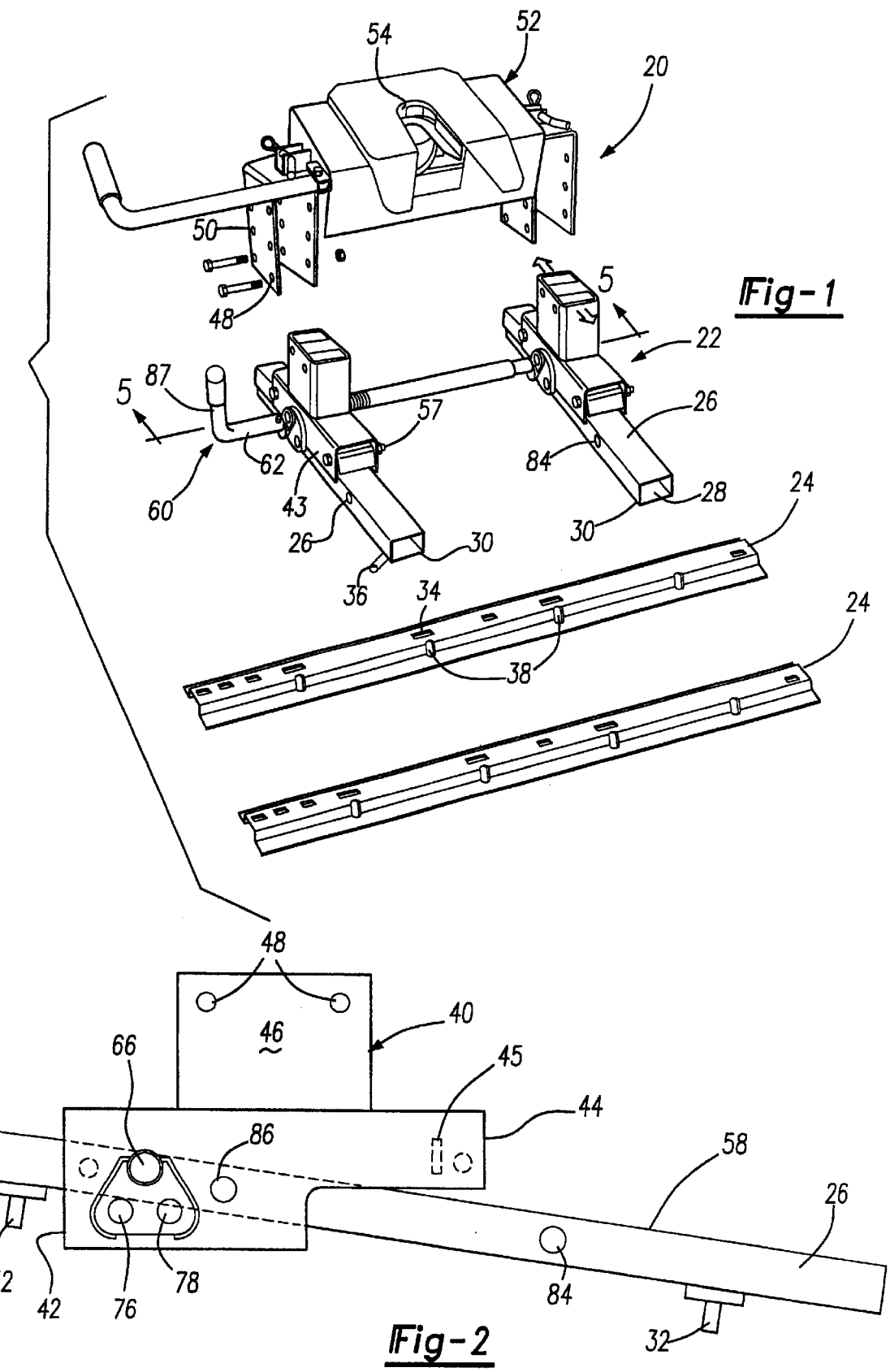

GLIDER FIFTH WHEEL ATTACHMENT

CROSS-NOTING TO RELATED APPLICATIONS

This application is a continuation of U.S. patent application Ser. No. 09/834,317, filed Apr. 13, 2001 now U.S. Pat. No. 6,386,570, which in turn is a continuation of U.S. patent application Ser. No. 09/320,498, U.S. Pat. No. 6,247,720, filed May 26, 1999.

FIELD OF THE INVENTION

The present invention relates generally to towing devices and, more particularly, to an adjustable fifth wheel hitch attachment for enhanced maneuverability in limited or tight operating areas.

BACKGROUND OF THE INVENTION

Fifth wheel hitches for towing a trailer behind a towing vehicle are well known in the art. Typically, fifth wheel hitches include a support frame for mounting the hitch to the towing vehicle. Usually, fifth wheel hitches are mounted within the bed of a pick-up truck. The support frame includes a pair of transverse rails that are bolted to the bed and/or frame of the truck, rail assemblies that are releasably mounted to the transverse rails and upright assemblies mounted to the rail assemblies. A transverse cross bar typically interconnects the upright assemblies, thereby forming a head support for mounting a head assembly by means of a trunnion arrangement allowing for pivotal fore and aft movement. The head assembly includes a jaw assembly operable by means of a control handle and is specifically adapted to releasably engage and hold a kingpin of a towed vehicle.

Conventional fifth wheel trailer hitches typically limit the maneuverability of a towing vehicle at low speeds and in close quarters. In particular, fifth wheel hitches typically center the kingpin of the towed vehicle substantially between the rear wheels and over the rear axle of the towing vehicle. When so mounted, very close clearance is provided between the towed vehicle and portions of the towing vehicle. Under normal towing conditions, the close clearance is sufficient to allow effective operation under speed on the open road. However, the close clearance may hinder maneuverability, especially in situations requiring tight cornering within limited space, such as, for example, the conditions found at campgrounds and some trailer parks.

In order to address the maneuvering shortcomings of conventional fifth wheel trailer hitches, various attempts at adjustable fifth wheel hitches have been made. It has been found that by temporarily moving the hitch assembly rearward in the towing vehicle, clearance between the towing vehicle and the towed vehicle is increased, thereby allowing for greater maneuverability of the towed vehicle. In one adjustable fifth wheel hitch design, the towed vehicle must be detached from the fifth wheel hitch prior to any adjustment of the fifth wheel hitch. The detachment efforts are time consuming and require precise movement of the towing vehicle. The adjustable hitches also typically require more than one person to effect the adjustment of the fifth wheel hitch. Another design utilizes low friction shoes within upright mounting members for movement on parallel guide rails. The uprights are selectively slideable along each guide rail. Each upright includes a hollow cavity for receiving a dual bar latch and a leaf spring for biasing the dual bar latch into a position to lock the uprights against slideable movement. However, the effective weight borne by the low friction shoes tends to cause binding of the shoes such that seizing may occur. The high friction between moving parts prevents easy and smooth adjustment of the fifth wheel trailer hitch. Moreover, the latching mechanism is hidden from view, thereby preventing an operator from confirming engagement of the locking mechanism to lock the adjustable portion against slideable movement.

SUMMARY OF THE INVENTION

The present invention is directed to a glider fifth wheel attachment assembly for use with fifth wheel towing assemblies attached to motor vehicles. The glider fifth wheel attachment assembly includes a support frame including a pair of spaced guide rails and a pair of upright assemblies attached to the guide rails. Each upright assembly includes a lower sleeve portion for receiving a respective guide rail, an intermediate housing portion vertically above the sleeve portion, and an upper mounting portion vertically above the housing portion. A head assembly may be adjustably mounted between respective mounting portions of the upright assemblies. One roller is positioned within each housing portion of the upright assemblies such that the roller contacts an upper surface of an upper guide rail. The glider fifth wheel attachment assembly further includes a latching assembly for releasably locking the glider fifth wheel attachment assembly between a first and a second towing position.

In a preferred embodiment, each housing portion includes two spaced rollers contacting the upper surface of the respective guide rails. In a most preferred embodiment, the latching assembly further includes a generally L-shaped bar, wherein a first end of the bar extends through aligned apertures in the housing portions. At least one latch pin is mounted parallel to and laterally spaced from the first end adjacent at least one of the upright assemblies. The latch pin is received in one of a plurality of apertures formed in the guide rails, wherein the plurality of apertures correspond to the respective first and second positions. Moreover, the latching mechanism is preferably biased to a latched position in either the first or second position by means of a compression spring located along the first end of the latching bar. The housing portions may further include at least one strap parallel to an axis of rotation of the rollers, and closely adjacent thereto.

The glider fifth wheel attachment assembly of the present invention allows adjustment of the fifth wheel hitch assembly using rollers. As a result, the fifth wheel trailer hitch is allowed to roll fore and aft, while the towed vehicle remains coupled to a towing vehicle. Advantageously, the glider fifth wheel attachment assembly rolls, rather than slides. Binding between the fifth wheel trailer hitch and the guide rails due to uneven rolling or excessive friction is therefore entirely eliminated. In the preferred embodiment, the latching mechanism is visible outside of the upright assemblies so that an end user may positively identify when the glider fifth wheel attachment assembly is locked in either a first or a second position. Moreover, the latching mechanism is preferably biased to a latched position in either the first or second position by means of a compression spring located on a first end of the latching bar. In this way, shortcomings of prior art adjustable fifth wheel hitch assemblies are overcome.

BRIEF DESCRIPTION OF THE DRAWINGS

The features and inventive aspects of the present invention will become more apparent upon reading the following detailed description, claims, and drawings, of which the following is a brief description:

FIG. 1 is an exploded view of a fifth wheel trailer hitch incorporating the glider fifth wheel attachment assembly of the present invention.

FIG. 2 is a side view of the glider fifth wheel attachment assembly of the present invention.

DETAILED DESCRIPTION OF PREFERRED EMBODIMENTS

Figure 3:
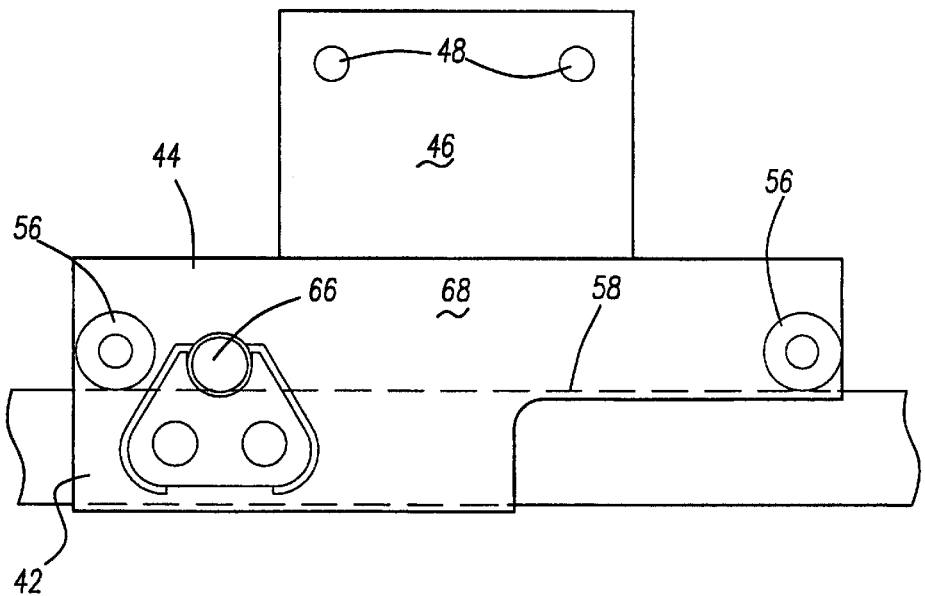
FIG. 3 is a side view of a portion of the glider fifth wheel attachment assembly of the present invention.
Figure 4:
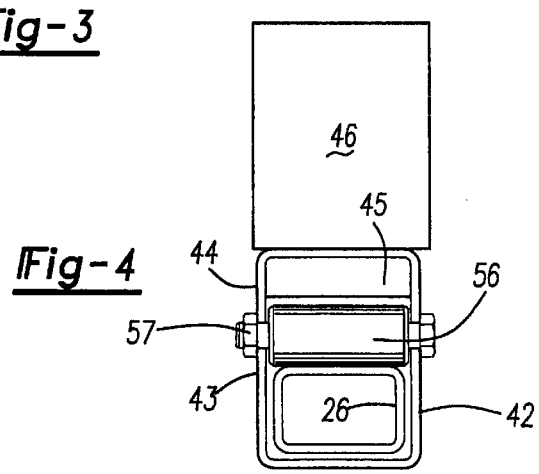
FIG. 4 is an end view of FIG. 3 showing the rollers of the present invention.

A fifth wheel hitch assembly 20 is shown in FIG. 1 incorporating the glider fifth wheel attachment assembly 22 of the present invention. The hitch assembly 20 is generally mounted on a support frame comprising a pair of spaced base rails 24 of conventional design that are bolted or otherwise fastened to the frame of a motor vehicle in a manner well known in the art.

According to the invention, a pair of spaced, parallel guide rails 26 are mounted to bridge between the base rails 24. The guide rails 26 therefore extend parallel to the longitudinal axis of the motor vehicle when properly mounted. Preferably, each guide rail 26 is formed from a four-sided tube constructed from steel or other suitable high strength material. If desired, an end cap 28 may be affixed to each free end 30 of the guide rails 26. As best seen in FIG. 2, each guide rail 26 further includes downwardly extending tabs 32 at pre-determined positions along the axial length of the guide rails 26. The tabs 32 are received within slots 34 (FIG. 1) formed in the base rails 24. Once the tabs 32 are inserted into proper slots 34, a connecting pin 36 is inserted through aligned, cooperating apertures 38 to capture the tab 32 and affix the guide rails 26 to the base rails 24, thereby effecting proper installation of both base rails 24 and guide rails 26.

According to the present invention, portions of the glider fifth wheel attachment assembly are mounted to the guide rails 26 before the guide rails 26 are attached to the base rails 24. As best seen in FIG. 2, an upright assembly 40 is mounted to each guide rail 26. Each upright assembly 40 includes a lower sleeve portion 42 (see FIG. 3), an intermediate housing portion 44, and an upper mounting portion 46. The guide rail 26 is inserted within the sleeve portion 42 before being attached to the base rails 24. Therefore, it may be appreciated that the sleeve portion 42 is sized to be slightly larger than the dimensions of the four-sided guide rails 26 so that the walls 43 of the sleeve portion 42 do not interfere with longitudinal movement of the upright assemblies along the guide rails 26.

The upper mounting portion 46 of the upright assembly 40 includes spaced bolt holes 48 for mounting a cross-member or head support 50. Conventionally known head supports 50 are height adjustable to enhance the versatility of the hitch assembly 20 in interconnecting towing vehicles and towed vehicles of various heights and dimensions. A head assembly 52 for receiving attachment means of a towed vehicle is attached to the head supports 50. The head assembly 52 includes a jaw assembly 54 for releasably engaging a kingpin (not shown) of a towed vehicle (not shown). Jaw assemblies such as shown at reference 54 are well known in the art. The head assembly 52 is also typically pivotally mounted to the head support 50.

To provide smooth adjustability, the glider fifth wheel attachment assembly of the present invention further includes at least one roller 56 mounted within each housing portion 44 of the upright assemblies 40. Preferably, as best seen in FIG. 3, two rollers 56 are mounted within the housing portion 44, with the rollers being placed adjacent the longitudinal edges of the upright assembly 40 for better support of the fifth wheel hitch assembly. Preferably, the rollers are formed from a hard material capable of withstanding the loading forces of a towed vehicle while not adversely interacting with the guide rails 26. The rollers 56 contact an upper surface 58 of the guide rails 26 to allow the glider fifth wheel attachment assembly 22 to be easily moved between a first, or towing, position and a second, or maneuvering, position.

The glider fifth wheel attachment assembly is shown in the first, or towing, position in FIG. 1. Because the rollers 56 are installed using bolts 57, the side walls 68 of the housing portion 44 may be compressed inwardly. To prevent excess compression, a metal strap 45 may be formed between the sidewalls 68 parallel to an axis of rotation of the rollers 56 to limit the amount that the bolts 57 may be tightened.

The first, or towing, position preferably fixes the location of the head assembly 52, and therefore the load of the towed vehicle, substantially over the rear axle and between the rear wheels of the towing vehicle. In this position, clearance between the towed vehicle and the towing vehicle is minimized, but is within acceptable limits for normal towing operations. However, the clearance between the towing and towed vehicles when the location of the head assembly 52 is in the first position is often insufficient to allow precise maneuvering within limited spaces such as those found in campgrounds or trailer parks. As a result, maneuvering in limited spaces often causes undesirable contact between the towing and towed vehicles, possible damaging either vehicle. To reduce the possibility of undesirable interaction between the towing and towed vehicles, the glider fifth wheel attachment assembly 22 of the present invention may be moved rearwardly to a second position by the towing vehicle operator while the towed vehicle is still attached to the head assembly, thereby increasing the clearance between the towing and the towed vehicles.

Figure 5:
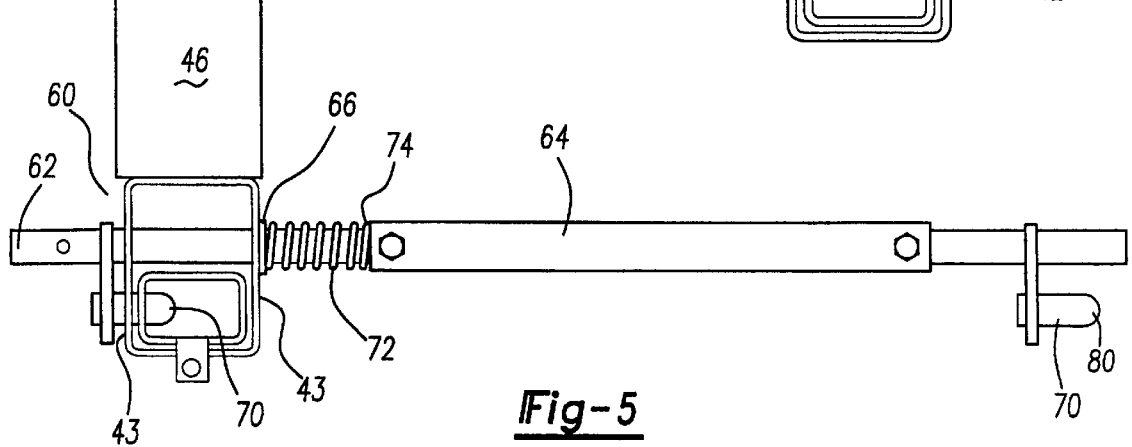
FIG. 5 is a cross sectional view along lines 5—5 of FIG. 1 showing the latching mechanism of the present invention.

In particular, as best seen in FIG. 5, a latching mechanism 60 is used to lock the glider fifth wheel attachment assembly 22 of the present invention into either the first or the second positions. The latching mechanism 60 preferably includes a generally L-shaped bar 62 that is selectively rotatable between a first and a second position. The bar 62 may be a unitary piece, or it may include several pieces fastened together, as shown in FIG. 5. A first end 64 of the bar 62 extends through aligned apertures 66 formed in the sidewalls 68 of the housing portion 44. Preferably, the first end 64 extends between both upright assemblies 40 perpendicular to the guide rails 26. At least one latch pin 70 is fixedly mounted along the first end 64 of the bar 62 such that the latch pin 70 is parallel and laterally spaced from the bar 62 axis of rotation (indicated generally by line 5—5 of FIG. 1). As seen in FIG. 5, the latch pin 70 is preferably mounted adjacent to a side wall 43 of the sleeve portion 42. Importantly, the latch pin 70 is not hidden within the upright assembly 40, but rather is in plain view so that an operator may visibly confirm adequate latching. A compression spring 72, mounted between an upright assembly 40 and a shoulder 74 formed along the bar first end 64 resiliently biases the latching pin 70 into engagement with either a first latching hole 76 (see FIGS. 2 and 3), corresponding to a first position, or a second latching hole 78, corresponding to a second position. Both latching holes 76, 78 are formed in the side wall 43 of the lower sleeve portion 42 generally vertically below the aligned holes 66. Preferably, pins 70 include a beveled tip 80 to enable easy insertion into the latching holes 76, 78.

In addition to engaging one of the latching holes 76,78, the latch pin 70 also engages one of holes 84, 86 formed in the guide rails 26 that align with the latching holes 76, 78. Preferably, latching hole 76 aligns with hole 84 in the guide rail 26 when the glider attachment assembly 22 is in the first position for towing the fifth wheel trailer. Likewise, latching hole 78 preferably aligns with hole 86 in the guide rail 26 when the glider attachment assembly 22 is in the second position for maneuvering the fifth wheel trailer in tight spaces. And when the glider fifth wheel attachment assembly 22 is in either the first or the second position, the latching mechanism 60 ensures that the entire assembly is fixed in place because the latch pins 70 are inserted within the appropriate aligned holes. In a preferred embodiment, the first end 64 of the L-shaped bar is provided with a second latch pin 70 adjacent to the second guide rail 26 that engages corresponding holes in the second guide rail that are aligned with holes 84 and 86 in the first guide rail.

The glider fifth wheel attachment assembly shown in FIG. 1 is in the first or towing position, such that the head support 50 and the head assembly 52 are positioned towards the front of the towing vehicle (not shown). The latching mechanism 60 is rotated so that a second end 87 of the L-shaped bar 62 points generally vertically, causing the latch pin 70 to engage the first latching hole 76, and in turn, the first guide rail hole 84 to secure the glider assembly in place. In the first position, the glider attachment assembly 22 distributes the weight of the towed vehicle over the towing vehicle rear axle, thereby achieving stable towing under normal operation.

When required, however, the operator of the towing vehicle may simply and easily adjust the glider attachment assembly 22 to provide additional clearance between the towing vehicle and the towed vehicle to enhance the maneuverability of the towed vehicle. To achieve the additional clearance, the operator stops the towing vehicle and manipulates the L-shaped bar 62 of the latching mechanism 60. The L-shaped bar is first pulled in a direction away from the glider assembly (to the left in FIGS. 1 and 5), thereby compressing the spring 72 and removing the latch pins 70 from within holes 76 and 84. The operator then pivots the L-shaped bar 62 in a direction away from the towed vehicle (i.e. counterclockwise), thereby moving the latch pins 70 from the first position to a second position engaged within hole 78 on the lower sleeve portion of the upright assembly 40. Because the latching hole 78 is not immediately aligned with the second hole 86, the glider assembly is allowed to smoothly roll rearwardly of the towing vehicle on the rollers 56, causing the towed vehicle to move backwardly and away from the towing vehicle a predetermined amount. To accomplish the movement of the glider attachment assembly, the towed vehicle may be manually pushed backwardly while the towing vehicle remains stationary if the towed vehicle is on an appropriately smooth and level surface. Alternatively, the operator may move the towing vehicle forward while engaging the brakes of the towed vehicle to accomplish movement of the glider attachment assembly. Once the latch pins 70 are disengaged, the rollers 56 allow such a smooth transition between first and second positions that often only manually applied force is necessary to move the glider assembly, whereas prior art adjustable fifth wheel hitch assemblies require moving the towing vehicle forward.

Because the latch pins 70 are resiliently biased by the compression spring 72, once the second guide rail hole 86 becomes aligned with the second latch hole 78 after the glider assembly has moved the predetermined amount, the latch pins 70 snap into place, thereby locking the glider attachment assembly 22 against further rearward movement. In this way, the glider attachment assembly becomes locked in a second position, where additional clearance is provided between the towing vehicle and the towed vehicle. Preferably, the glider attachment assembly is allowed to move between 6 and 10 inches rearwardly. Most preferably, the glider attachment assembly 22 allows for 9.5 inches of travel between the first and the second positions. The added space or clearance between the towing and the towed vehicles allows for sharp turning so that the operator may negotiate tight spaces where maneuverability is required.

It should be noted that the reverse procedure applies to return the glider attachment assembly 22 to the first position. Thus, when enhanced maneuverability is no longer required, the operator pulls the L-shaped bar 62 away from the glider attachment assembly and rotates it clockwise so that the latch pins engage the first latching hole 76. The towed vehicle is then moved towards the towing vehicle until the resiliently biased latch pins 70 additionally engage the first guide rail holes 84.

The rollers 56 of the present invention therefore provide significant advantages over the prior art. In particular, the fifth wheel trailer hitch is allowed to roll fore and aft, while the towed vehicle remains coupled to a towing vehicle without suffering from binding due to excessive friction or metal to metal binding caused by wear and compression of low friction shoes. Thus, binding between the fifth wheel trailer hitch and the guide rails due to uneven rolling or excessive friction is eliminated. Moreover, in the preferred embodiment, the latching mechanism 60, comprising an L-shaped bar 62 and latch pins 70, is visible outside of the upright assemblies so that an operator may positively identify when the glider fifth wheel attachment assembly 22 is locked against movement in either a first or a second position. The glider attachment assembly 22 of the present invention may also be used with any commercially available fifth wheel hitch assembly to convert the fifth wheel hitch into an adjustable assembly capable of moving between a first and a second towing position. Thus, the present invention solves all problems present in prior art adjustable fifth wheel trailer hitch assemblies.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

What is claimed is:

1. A glider fifth wheel attachment assembly, comprising:
   an upright assembly including a housing portion having side walls;
   a support frame including at least one guide rail, a portion of said at least one guide rail being inserted within said upright assembly, said at least one guide rail having a surface; and
   at least one roller mounted to said housing portion, said at least one roller positioned such that said at least one roller contacts the surface of said guide rail to allow said housing portion of said upright assembly to move between a first and a second position.

2. The glider fifth wheel attachment assembly according to claim 1, wherein said at least one roller is mounted between the side walls of said housing portion.

3. The glider fifth wheel attachment assembly according to claim 1, wherein said at least one roller is mounted adjacent to longitudinal edges of said upright assembly.

4. The glider fifth wheel attachment assembly according to claim 1, further comprising a latching mechanism for releasably locking the glider assembly against movement between the first and second positions.

5. The glider fifth wheel attachment assembly according to claim 4, wherein said latching mechanism comprises a bar, a first end of said bar extending through aligned apertures in said housing portion, and at least one latch pin mounted along said first end adjacent to said upright assembly.

6. The glider fifth wheel attachment assembly according to claim 1, further comprising a plurality of rollers mounted to said housing portion, said plurality of rollers contacting the surface of said guide rail to allow said housing portion of said upright assembly to move between the first and second positions.

7. The glider fifth wheel attachment assembly according to claim 6, wherein said plurality of rollers are mounted to the side walls of said housing portion.

8. The glider fifth wheel attachment assembly according to claim 1, wherein said upright assembly further comprises a lower sleeve portion and an upper mounting portion.

9. The glider fifth wheel attachment assembly according to claim 8, further comprising a head support mounted to said upper mounting portion of said upright assembly.

10. The glider fifth wheel attachment assembly according to claim 9, further comprising a head assembly mounted to said head support.

11. An adjustable fifth wheel trailer hitch assembly, comprising:

a pair of base rails mounted to a frame of a motor vehicle;

a pair of upright assemblies, each upright assembly including a housing portion with side walls;

a pair of guide rails mounted substantially perpendicular to said pair of base rails, a portion of each guide rail inserted within a respective one of said pair of upright assemblies, each guide rail having a surface; and at least one roller mounted to said housing portion of each upright assembly and contacting the surface of said pair of guide rails, said at least one roller enabling said housing of said upright assembly to move between a first, towing position and a second, maneuvering position.

12. The adjustable fifth wheel trailer hitch assembly according to claim 11, further comprising a latching mechanism including a bar extending through aligned apertures in said housing for releasably locking the glider assembly against movement between the first and second positions.

13. The adjustable fifth wheel trailer hitch assembly according to claim 11, wherein said upright assembly further comprises a lower sleeve portion and an upper mounting portion.

14. The adjustable fifth wheel trailer hitch assembly according to claim 13, further comprising a head support mounted to said upper mounting portion of said upright assembly.

15. The glider fifth wheel attachment assembly according to claim 14, further comprising a head assembly mounted to said head support.

* * * * *